(12) United States Patent
Vincent (10) Patent No.: US 7,725,108 B2
(45) Date of Patent: May 25, 2010

(54) METHOD AND SYSTEM FOR PLANNING THE POWER OF CARRIERS IN A CELLULAR TELECOMMUNICATIONS NETWORK

(75) Inventor: François Vincent, Clamart (FR)

(73) Assignee: Societe Francaise du Radiotelephone (FR)

( * ) Notice: Subject to any disclaimer, the term of this patent is extended or adjusted under 35 U.S.C. 154(b) by 1057 days.

(21) Appl. No.: 11/417,086

(22) Filed: May 3, 2006

(65) Prior Publication Data

US 2007/0026886 A1     Feb. 1, 2007

(30) Foreign Application Priority Data

May 9, 2005     (FR)     ................................. 05 04635

(51) Int. Cl.
*H04W 40/00* (2009.01)
(52) U.S. Cl. ..................... 455/446; 455/447; 455/522
(58) Field of Classification Search ................ 455/446, 455/447, 522
See application file for complete search history.

(56) References Cited

U.S. PATENT DOCUMENTS

2003/0064741 A1* 4/2003 Silva et al. .................. 455/522
2004/0014476 A1* 1/2004 Barberis et al. ............. 455/446

FOREIGN PATENT DOCUMENTS

EP          1 335 616 A2     1/2003

* cited by examiner

*Primary Examiner*—Patrick N Edouard
*Assistant Examiner*—Aung Win
(74) *Attorney, Agent, or Firm*—Perman & Green LLP

(57) ABSTRACT

A system allowing reuse of one same frequency on all the cells of a network. It includes means storing data characteristic of the network and a computing module provided with means to associate carriers of a transmitter with service areas to distribute the traffic to be handled in the sector over N shares of traffic in N complementary areas determined in relation to their radio attenuation, and a determined frequency with each service area, the different carriers used being respectively associated with a single service area of a sector.

With the system it is possible to adjust the transmission power of each carrier in relation to the determination made by the computing module to share the power of transmitter between the carriers of one same sector.

20 Claims, 3 Drawing Sheets

METHOD AND SYSTEM FOR PLANNING THE POWER OF CARRIERS IN A CELLULAR TELECOMMUNICATIONS NETWORK

CROSS-REFERENCE TO RELATED APPLICATIONS

This application claims priority from French Patent Application No. 05 04635, filed on May 9, 2005.

TECHNICAL AREA OF THE INVENTION

The present invention relates to cellular mobile radio networks and more particularly, for the purpose of improving radio coverage and user bit-rate in an operator-managed network, to a method and system for planning the power of carriers in a cellular telecommunications network.

A cellular mobile radio network consists of a plurality of radio base stations provided with transceivers which ensure the radio coverage of areas defining respective cells. In a wireless communication system each base station communicates with a plurality of remote terminals such as cellular mobile phones. Frequency-Division Multiple Access (FDMA) and Time-Division Multiple Access (TDMA) are conventional multiple access layouts to deliver simultaneous services to a certain number of terminals. The basic idea underlying FDMA or TDMA systems consists of dividing the available resource into several frequencies or several time divisions respectively, so that several terminals are able to function simultaneously without interference.

Telephones operating under the GSM standard (Global System for Mobile Communications) belong to the FDMA and TDMA systems in that transmission and reception are made at different frequencies and also at different time intervals.

Unlike these systems using frequency division or time division, the CDMA systems (for Code Division Multiple Access) enable multiple users to share a common frequency and a common time channel using encoded modulation. The use of spectrum-spreading CDMA techniques offers high data rates for mobile terminals. The most recent CDMA standard (e.g. Wide Band CDMA: W-CDMA) of the so-called third generation (3G) is in the progress of being deployed for numerous operators. Among the CDMA systems, mention may be made of the CDMA 2000 system, W-CDMA system ("Wide Band CDMA") or the IS-95 standard.

Among CDMA systems, systems can be distinguished which use a separate frequency for transmitting and receiving (CDMA-FDD system) and those which use a common frequency for transmitting and receiving but separate time domains for transmitting and receiving (CDMA-TDD system). For CDMA-type systems, a network architecture of the type using the IP protocol (internet protocol) allows transmission of data in packets at a fast rate on a DSCH channel (Downlink Shared Channel) for example via radio access of HSDPA type (for High-Speed Downlink Packet Access). The HSDPA mode is more efficient encoding than that of conventional UMTS making it possible to increase the data rate. Similar to HSDPA technology specified by 3GPP (third generation partnership plan) other radio access technologies exist using several channels, such as the CDMA 2000 1xEvDO technology (Evolution Data Only) to ensure particularly high data rates. By way of indication, the HSDPA standard was specified to provide greater capacity and higher transmission speeds (up to 14 Mbps) on existing W-CDMA networks and should offer both operators and subscribers improved quality of service and a more advantageous cost/performance ratio. With this type of technology, operators can take in charge a much greater number of high data rate subscribers on the same radio frequency (carrier) and can guarantee subscribers optimal use of existing or future multimedia services.

The invention advantageously applies to communication networks of CDMA type, or more widely to networks using radio access technology requiring several DSCH channels each using a radio frequency called a carrier, all the cells using the same radio frequencies with a constant transmission power, radio access not requiring continuity of coverage on each frequency. The invention therefore applies in particular to the data access technologies defined and specified by 3GPP such as HSDPA, CDMA 2000 1xEvDO and similar data access technologies (not using circuit switching voice transmission) which provide the necessary additional capacity to meet the increasing needs of the mobile telephony market in terms of high-speed mobile applications such as the downloading of contents.

TECHNOLOGICAL BACKGROUND OF THE INVENTION

A method is known from document WO 2005/011154 which sets out to prevent a reduction in data transmission rate towards users in a 1xEvDO system. However this method solely concerns connection problems in a base station and proposes the management of user-associated connections to avoid overloading some of these connections.

In known cellular mobile telephony systems of CDMA type using several carriers, there is no method for optimising the capacity of the network, in particular by limiting accumulated transmission powers towards user mobile terminals so as to adapt operationally to the traffic to be handled. Existing solutions are limited to power planning within each cell, which is unsatisfactory from an operational viewpoint since load disparities exist within one same cell.

One major disadvantage of known methods is that some areas within a cell do not provide radio access of quality on account of a signal-to-noise ratio (SNR) that is too low. In these areas, data transmission rate is therefore very low (for a determined bandwidth) or else the use of a very broad channel is required to ensure a sufficient bit rate.

By way of illustration, the power ratio C/I between the carrier signal and the interferer signal may vary from 0 to more than 15 dB depending on whether the client using the mobile terminal is on the edge of a cell or nearer the transmitter. To improve network capacity, current solutions consist of adding new carriers on additional frequencies, the channelling of technologies of CDMA type being fixed (channel width of 1.25 MHz for CDMA 2000, 5 MHz for UMTS.

There is therefore a need to find a method more adapted to actual site conditions with which it is possible to efficiently configure the network so as to optimise the global capacity of the network and the data rate for users located in those cell areas that are least well served.

GENERAL DESCRIPTION OF THE INVENTION

The purpose of the present invention is to eliminate one or more prior art disadvantages by defining a power planning method enabling a cellular telecommunications network of CDMA type to provide an optimised effective bit rate at every point of a cell.

A further object of the invention is to optimise the use of available power in the amplifiers of each radio base station used for wireless access to data by high-speed packet transmission technologies (3GPP: HSDPA, CDMA 2000

1xEvDO, etc) when this power has to be shared between the different frequencies (wide band power amplifiers).

For this purpose the invention concerns a method for planning carrier power in a cellular wireless communication network whose characteristic is to allow the reuse of one same frequency on all the cells of the network (of CDMA-type access for example) provided with radio base stations having transmitters to transmit data towards determined transmission sectors and to ensure radio coverage of areas defining respective cells, the method being implemented via a data processing system provided with memorising means to store data representing geographical areas divided into a plurality of dots or pixels as per the division of said network, data characteristic of the network sectors and transmitters, data representing transmit/receive radio attenuation for each sector, data representing traffic volume and distribution in the network, the method being characterized in that a computing module in the data processing system, for each transmission sector associated with a transmitter having a plurality of carriers, conducts an assignment step assigning the carriers to service areas, the computing module using the data stored in the memorising means to distribute the overall traffic of the sector to be handled into N traffic shares in N complementary service areas in relation to their radio attenuation and geographically forming rings increasingly distanced from the transmitter, the method also comprising:
- a frequency planning step including the assignment of a determined frequency to each service area so that the different carriers used in a sector are respectively associated with a single service area of said sector;
- a power adjustment step for each of the carriers including the determination, by the computing module and for each service area, of the signal-to-noise ratios in each pixel and of the traffic handling capacity of the carrier associated with this service area, sharing of the transmitter power between the carriers of one same sector being made as determined by the computing module so that said power adjustment step corresponds to the obtaining of a maximum value for the sum of traffic handling capacities by the carriers for each sector, said maximum resulting in particular from at least one comparison by the computing module between several separate solutions for sharing power between the carriers.

With the invention it thereby becomes possible to plan the power of each carrier separately in relation to the traffic to be covered.

According to another characteristic, the sharing of the transmitter power between the carriers of one same sector is made in the manner determined by the computing module so that said power adjustment step corresponds to obtaining minimum dispersion of the traffic handling capacities individually provided by the different carriers of the sector.

According to a further characteristic, the service areas are determined in a sector in relation to attenuation thresholds, a first service area grouping together those pixels whose attenuation of transmit/receive radio signal propagation is lower than a first determined threshold, whilst at least one second service area groups together pixels whose attenuation of transmit/receive radio signal propagation lies between said first threshold and a predetermined maximum attenuation.

Through the invention it is therefore possible to use a specific carrier to supply a service area distanced from the transmitter. The carrier associated with this distanced service area may advantageously be transmitted with stronger power to ensure a data transmission rate that is comparable with the rate supplied in the vicinity of the transmitter by a carrier having a weaker transmitting power.

According to another characteristic, the method of the invention comprises a step to set the following configuration parameters:
- a list of sectors and their available power characteristics,
- matrixes of propagation attenuation for each sector;
- matrix of traffic distribution;
- coefficient of use representing a traffic volume;
- specifications of the number of carriers per sector;
- matching rules to associate carriers with transmitter amplifiers;
- estimation parameters for use in at least one convergence function used to verify that said power adjustment corresponds in particular to obtaining a maximum value for the sum of traffic handling capacities of the carriers of all the sectors.

According to a further characteristic, the data representing traffic volume and distribution in the network comprises maps of traffic distribution made via the data processing system using the data representing geographical areas and the data representing traffic in the network of subscribers to said network including quantitative and qualitative measurements of subscriber traffic on the network, said measurements corresponding to at least one determined time slot, at least one map of traffic distribution in the network being obtained after selection of at least one geographical area via interactive means between the user and said data processing system and the retrieval by said system of data representing the traffic corresponding to said selected geographical area and to a determined time slot, so that through the use of these data items by the data processing system it is possible to build up data representing cell coverage associated with each transmitter.

According to another characteristic, the data representing traffic in the wireless communication network comprises data supplied by counting means and extracted from at least one operating and maintenance centre by extraction and tabling means of said data processing system According to another characteristic, the assignment step assigning carriers to service areas is preceded by a calculation step to calculate traffic distribution in an area corresponding to network coverage, the traffic distribution calculation step using the traffic distribution maps to estimate the traffic in each of the pixels and takes into account, via the data representing transmit/receive radio attenuation for each sector, the attenuation between the transmitter and receiver in a considered sector and assignment probability to the sector in relation to the field received and the receiving level of neighbouring sectors.

According to another characteristic, the traffic distribution calculation step comprises calculation of an accumulative distribution function of traffic to be handled in relation to the level of propagation attenuation in each sector under consideration.

According to another characteristic, the assignment step assigning carriers to service areas, and for at least one of the sectors, comprises the calculation of total traffic to be handled and the determination of a sufficient number N of carriers so that the capacity of all the carriers of the sector allows handling of total traffic.

According to another characteristic, the frequency planning step is preceded by a calculation step to calculate interference constraints between carriers including the calculation of a compatibility matrix between all the carriers of all the cells.

According to another characteristic, the power adjustment step for each of the carriers, for all the sectors, comprises a first estimation step estimating the convergence between a first criterion corresponding to obtaining a maximum value for the sum of traffic handling capacities of the carriers of the sectors and a second criterion corresponding to obtaining minimum dispersion of the traffic handling capacities individually provided by the different carriers of each sector.

According to another characteristic, said power adjustment step is followed by a calculation step to calculate new frequency constraints resulting from power adjustments, a second estimation step estimating the convergence between said first and second criteria then being performed.

According to another characteristic, the method of the invention comprises a third estimation step to estimate convergence between said first and second criteria, performed just after a new calculation step of the service areas of each carrier, said new calculation step particularly taking into account the changes arising from power adjustments.

According to another characteristic, each convergence estimation step comprises at least one calculation of said convergence function of the type corresponding to a difference between a first value representing the first criterion and a value representing the second criterion, followed by a comparison of the variation in this difference with an acceptance threshold which is not to be exceeded for convergence to be acceptable.

According to another characteristic, reiteration of transmitter power sharing between the carriers of one same sector is initiated in the event that the acceptance threshold is exceeded during the first estimation step of the convergence between said first and second criteria.

According to another characteristic, reiteration of the calculation step of interference constraints between carriers and of the frequency planning step is triggered in event that the acceptance threshold is exceeded during the second estimation step of convergence between said first and second criteria.

According to another characteristic, reiteration of the assignment step of carriers to service areas is triggered in the event that the acceptance threshold is exceeded during the third estimation step of convergence between said first and second criteria.

Therefore the invention advantageously makes it possible to optimise the sharing of power between carriers on one same transmitter in accordance with the two above-mentioned criteria, this being so for all the transmitters of the network, in particular by using the iterative loop for service area estimation made during the assignment step assigning the carriers to the service areas.

A further purpose of the invention is to provide a solution to one or more problems encountered in the prior art by defining a data processing system specially adapted to the method of the invention, in order to optimise the use of available power in the multi-carrier amplifiers (wide band) in particular for HSDPA and CDMA1xEvDO.

This purpose is achieved with a data processing system for implementing the method of the invention comprising a computing module and memorising means to store data representing geographical areas divided into a plurality of dots or pixels depending on the division of said network, data characteristic of the network sectors and transmitters, data representing transmit/receive radio attenuation for each sector, data representing traffic volume and distribution within the network, characterized in that it comprises selection means to select each transmission sector associated with a transmitter, the computing module comprising association means to:

associate carriers of the transmitter with service areas, using the data stored in the memorising means to distribute the total sector traffic to be handled over N shares of traffic in N complementary service areas determined in relation to their radio attenuation, associate a determined frequency with each service area so that the different carriers used in one sector are respectively associated with a single service area of said sector;

said data processing system comprising means to adjust the transmission power of each carrier in relation to the determination made by the computing module for sharing transmitter power between the carriers of one same sector.

According to another characteristic, the computing module shares the transmitter power between the carriers of one same sector using an optimisation programme adapted to obtain, according to a first criterion, a maximum value for the sum of the traffic handling capacities of the carriers of all the sectors and, according to a second criterion, a minimum dispersion of the traffic handling capacities individually provided by the different carriers of the sector, estimation parameters stored in memorising means being used by the computing module to allow optimisation of transmitter power sharing between the carriers.

According to another characteristic, the association means are arranged to take attenuation thresholds into account so as to determine the service areas of a sector, the association means grouping together the pixels having a lower attenuation of transmit/receive radio signal propagation than a first determined threshold in a first service area and, in at least a second service area, those pixels whose attenuation of transmit/receive radio signal propagation lies between said first threshold and a predetermined maximum attenuation.

According to another characteristic, the system comprises a data memory representing traffic data in the network at one determined time slot at least, the system also comprising:

interactive means between the user and said system, connected to selection means to select and display at least one of said geographical areas, superimposition means for superimposing on said selected geographical area the data which represents the traffic at a determined time slot to form at least one map of traffic distribution displayed by said interactive means;

extraction and tabling means, using data supplied by counting means from at least one operating and maintenance centre, to extract and table series of measurements in relation to geographical areas and time slots.

The invention, with its characteristics and advantages, will become more clearly apparent on reading the description made with reference to the appended drawings given as non-limitative examples and in which.

DESCRIPTION OF PREFERRED EMBODIMENTS OF THE INVENTION

Figure 1:
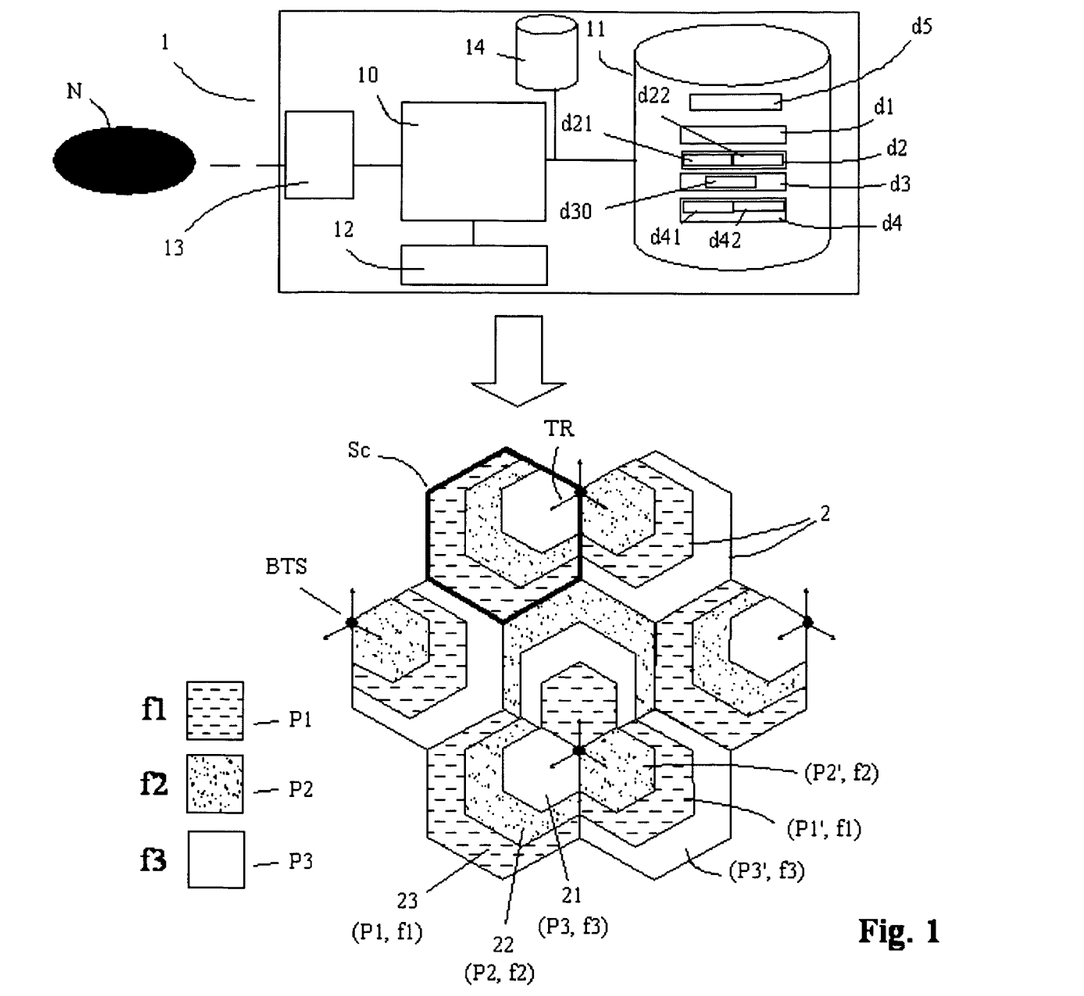
FIG. 1 is a schematic of the data processing system of the invention and part of the network illustrating the distribution of transmitter power between several service areas of a transmission sector.

With reference to FIG. 1, the power planning tool intended to optimise a cellular telecommunication network N consists of a data processing system 1 provided in particular with a computing module 10, memorising means 11 and selection means 12 to select respective transmission sectors Sc associated with a transmitter TR of a base transceiver station BTS. In one preferred embodiment of the invention, the memorising means 11 allow the storing firstly of data d1 representing geographical areas divided into a plurality of dots of pixels 301, 302, 303 (see FIG. 5) depending upon the division of said network, secondly of data d2 characteristic of sectors Sc and transmitters TR of network N, thirdly of data d3 representing transmit/receive radio attenuation for each sector Sc, and fourthly of data d4 representing traffic volume and distribution within the network N.

In known manner, when deploying coverage of a wireless communication network N, the cells are deployed so as to ensure continuity of this coverage. According to the invention, the coverage area of each transmitter TR is calculated using a prediction model associated with data bases d1 representing geographical areas and containing in particular appropriate land altimetry and morphology information. The probability of attachment to each transmitter TR is calculated at each dot or pixel 301, 302, 303 of the area under consideration, so that it is possible to define geographical transmission sectors Sc for each transmitter TR. The planning of radio frequencies used by a given transmitter can minimise interference (by minimising the carrier to interference ratio C/I) and maximize the bit rate at each point 301, 302, 303.

Traffic mapping can be associated with probabilities at each connection point to each cell to accurately define expected traffic inside each cell. The data processing system 1 is used for example when setting up the target radio network in a geographical area and allows different traffic maps to be drawn up. The traffic information obtained with the already existing network is used to predict judicious deployment of radio coverage.

Figure 5:
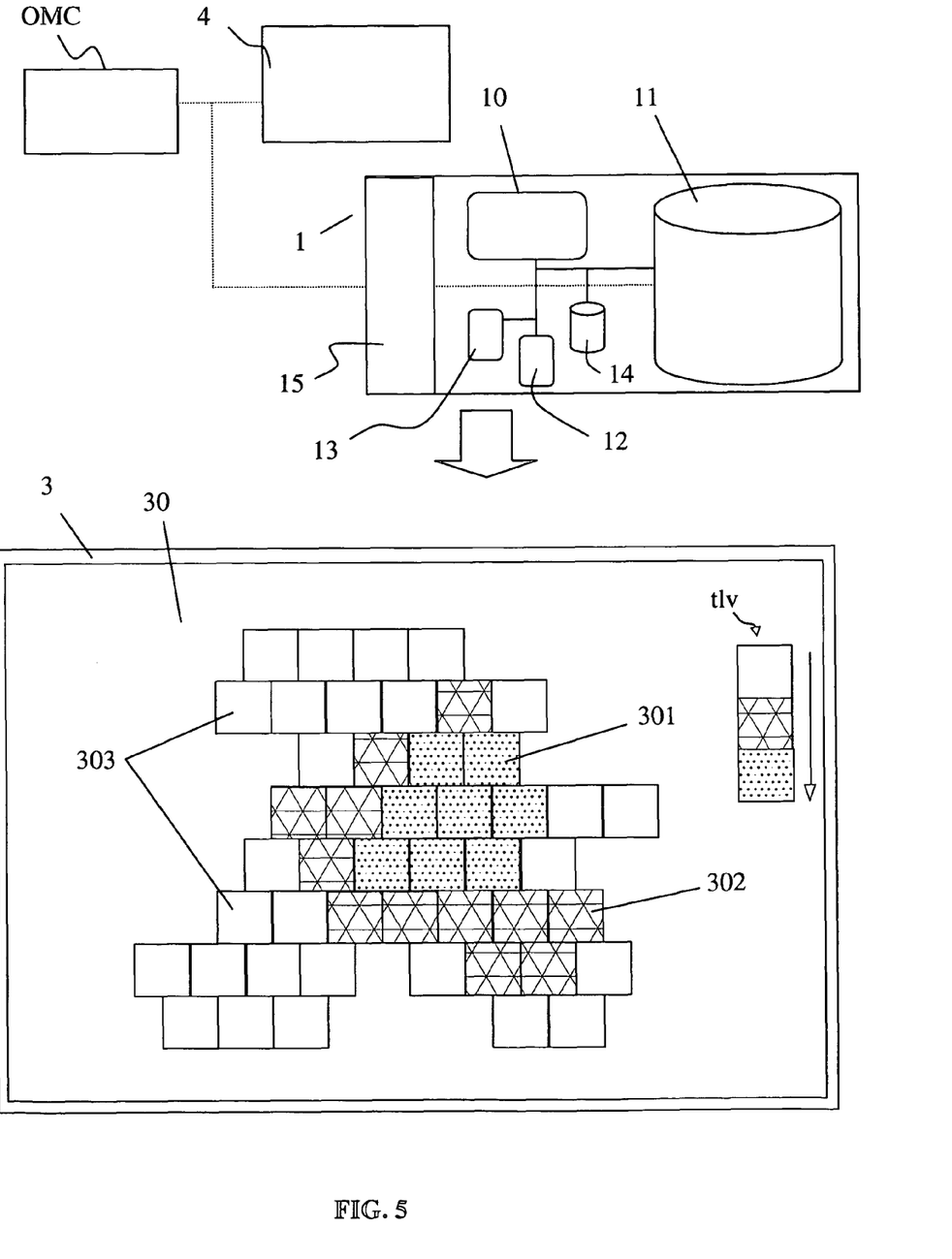

With reference to FIG. 5, on an interactive entry and display device 3 of the data processing system 1, a graphical representation of a map 30 is shown giving the traffic distribution of a wireless communication circuit (traffic data only) in a geographical area for which the target network is in the progress of being determined. The map 30 graphically shows the superimposition firstly of initial data from a digital map and secondly data representing traffic on the wireless communication circuit of network subscribers, these data items being stored for example in the memorising means 11. The computing module 10 of central unit or similar type, the memorising means 11, the data entry means using a mouse and keyboard or other device and the data presentation means on an interactive display screen 3 are not shown in detail.

The data representing the traffic of the wireless communication circuits comprises data supplied by counting means 4 and extracted from at least one operation and maintenance centre OMC by extraction and tabling means 15 used by the data processing system 1. This extracted data may consist of mean traffic measurements or several series of quantitative and qualitative traffic measurements taken at different points of the geographical area under consideration. Each series of measurements corresponds for example to a different time slot for one same location. In one embodiment of the invention, the extraction and tabling means 15 are used to classify measurements in relation to geographical maps and time slots. In the non-limitative example of a UMTS network the unit measurement of traffic is a cell unit.

In one embodiment of the invention, the data on current traffic is provided by counting means 4 of performance analysis type using indicators and counters (APIC). These counting means 4 can store the counters of the OMC centres for several weeks and can provide complex indicators based on the trends of these counters. A tool of APIC type can be used for example to consolidate the extraction of counters at national level from different OMC centres. These measurements are mean values for example calculated from measurements taken at every dot or pixel over one week and can be grouped together in a database accessible by the system 1 in the form of files or traffic tables.

In the embodiment shown FIG. 5, pixels 301, 302, 303 associate an identification colour or graphical shading or similar in relation to each traffic level value (tlv) expressed in $mE/km^2$ or equivalent unit of traffic representing occupation of radio resources. For example pixels 301 corresponding to traffic of between 10000 and 30000 $mE/km^2$ are shown in a warm colour with dark shading, pixels 302 corresponding to lesser traffic of more than 500 $mE/km^2$ is shown in a light warm colour, and pixels 303 for low traffic in another colour. In non-limitative manner, a much closer graduation of traffic level values (tlv) is preferably considered to allow better analysis of the network N.

The traffic distribution map 30 so obtained has the advantage of being independent of the wireless communication system or infrastructure used and its corresponding cellular network, allowing efficient prediction of traffic on system change. Additional carriers must be added where traffic so requires. For example, some sectors Sc (FIG. 1) with high traffic may be provided with 3 carriers C whilst a single carrier may suffice for other sectors corresponding to low traffic areas.

Once the number of transmitters TR has been determined, the system 1 of the invention can advantageously be used concomitantly to plan the power P and frequency f of each carrier C within each transmission sector Sc. With reference to FIG. 1, the computing module 10 is provided for example with association means to associate carriers C1, C2, CN-1 CN of a determined transmitter TR with service areas 2, using data d1, d2, d3, d4 stored in the memorising means 11 for equitable, optimal distribution of the total traffic TF of the sector Sc over these service areas 2. In other words, the system sets out to associate each carrier C with a service area 2 in optimised manner so that each carrier C takes in charge an equal share (TF/N) of total traffic TF to be handled in a sector Sc.

Figure 2:
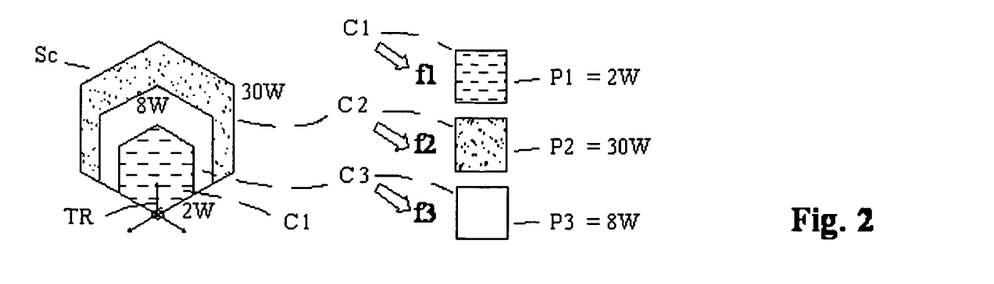
FIG. 2 shows an example of power distribution between several service areas for a total transmitter power of 40 W.
Figure 3:
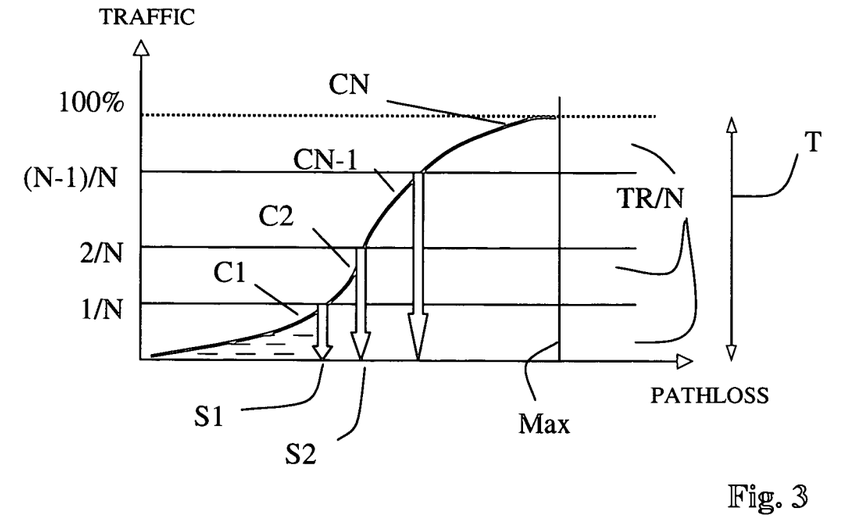
FIG. 3 is a graphical illustration of traffic distribution in a transmission sector in relation to transmit/receive attenuation within the sector.

With reference to FIG. 3, the service areas 2 may be divided up in relation to thresholds S1, S2 of transmit/receive radio signal attenuation. This translates in practice by division into geographical rings for service areas 21, 22, 23 as illustrated FIGS. 1 and 2. In the example shown FIG. 3, the association means of the computing module 10 ensure division of the total traffic TF to be handled in sector Sc into N shares of traffic (TF/N) in N complementary service areas 2 determined in relation to their radio attenuation. These means also associate a determined frequency f1, f2, f3 with each service area 21, 22, 23 so that the different carriers C used in one sector Sc are respectively associated with a single service area 2 of the sector Sc. The delimitation of the rings is determined per sector Sc in relation to attenuation thresholds S1, S2 (FIG. 3). For example a first service area 21 groups together the pixels whose attenuation of transmit/receive radio signal propagation is lower than a first determined threshold S1, whilst at least one second service area 22, 23 groups together those pixels whose attenuation of transmit/receive radio signal propagation lies between said first threshold S1 and a predetermined maximum attenuation (Max).

The data processing system 1 according to the invention comprises means 13 for adjusting the transmission power so that each carrier C takes in charge the traffic to be handled on a geographical ring delimited by the respective powers of the neighbouring and/or co-located carriers. The system 1 is adapted to calculate power thresholds within one same sector Sc and has means 13 to adjust the transmission power of each of the carriers C in relation to the sharing of the power of transmitter TR, as determined by computing module 10, between the carriers C of one same sector Sc.

The redirecting of each user radio terminal onto either one of the frequencies of one same sector Sc is managed by the data processing system 1 in relation to network parametering for example, or the difference in received field level between the frequencies of sector Sc, or the load of the different frequencies in sector Sc. The optimisation achieved by the system relates to the downward flow from the base station BTS to the radio terminal since traffic data is highly asymmetric.

The power planning method will now be described more specifically with reference to FIGS. 1 to 4.

The inventive method applies to a cellular wireless communication network N of CDMA access type, and requires an initialisation step 40 during which the system 1 sets all the configuration parameters of the problem to be solved, in particular:

- a list d2 of sectors Sc and their available power characteristics;
- matrices of propagation attenuation d30 for each sector;
- a matrix of traffic distribution d41;
- a coefficient of use representing a traffic volume d42;
- specifications d22 of the number of carriers per sector;
- matching rules d23 to associate carriers with transmitter amplifiers; and
- estimation parameters d5 intended for use in at least one convergence function (TEMP) used to verify that said power adjustment corresponds in particular to obtaining a maximum value for the sum of traffic handling capacities of the carriers C in all sectors Sc.

A calculation step 41 calculating traffic distribution in an area corresponding to coverage of the network N is previously performed to allow subsequent optimisation by planning the power of each transmitter TR. This calculation step 41 of traffic distribution uses the traffic distribution maps to estimate the traffic in each of the pixels and, via the data d3 representing transmit/receive radio attenuation for each sector Sc, takes into account an attenuation Si between transmitter and receiver in the sector under consideration and the probability of assignment to the sector in relation to the received field and reception level of neighbouring sectors.

The traffic may be oriented, using the RRM tool (Radio Resources Management) of the radio access technology, towards any one of the carriers in relation to a specific algorithmic mode. For example, the choice may be based on a criterion of received field level relative to reference thresholds. In an initial phase, traffic distribution in relation to estimated propagation attenuation between the transmitter TR and each point may be defined for each sector of each station BTS such as illustrated FIG. 3. In each elementary coverage area represented by a pixel 301, 302, 303 with coordinates "x, y" and for each sector Sc the method uses:

"Pathloss" attenuation between transmitter and receiver in a considered sector, where
the path (x, y)=1 if pathloss (x, y)=PATHLOSS, otherwise ρpath (x, y)=0
the pass probability (sector, x, y) of assignment to sector Sc in relation to this received field and the reception level of neighbouring sectors, said probability being calculated in the light of the standard deviation from the prediction model.

estimated traffic at this point "traffic(x,y)" derived from traffic mapping in the area under consideration.

The pathloss (x,y) function corresponds to radio attenuation which is related to distance from the transmitter TR. This function is specified for example by an explicit formula using propagation parameters or obtained by calibrating with a list of parameters, and can deliver a whole value called PATHLOSS at every point where there is traffic. This function therefore provides the PATHLOSS attenuation values to be used to permit distribution of the traffic within a sector Sc. According to the invention, by scanning all the PATHLOSS values for each sector Sc, the accumulative distribution function is obtained for the traffic to be handled in relation to PATHLOSS attenuation in the sector under consideration, as illustrated FIG. 3.

Traffic(sector,PATHLOSS)=
∫ traffic(x,y) *$\rho_{ass}$(sector,x,y) *$\rho_{ass}$(x,y) dxdy.

In the example of FIG. 3, attenuation thresholds S1, S2 are sought to equally divide traffic demand into N equal shares. The number N of carriers C1, C2, CN-1, CN in the sector Sc can either be specified directly by the user of the system 1, or calculated via the computing module 10 of the system 1. In the latter case the total traffic TF in a sector Sc is calculated by integrating the distribution function illustrated FIG. 3 for all PATHLOSS attenuation values and by multiplying by a coefficient of use (to represent the volume of traffic) specified by the user. The total traffic TF of the sector Sc is therefore obtained with the following formula:

Traffic (sector)=
use*$\int_{PATHLOSS}$ TRAFFIC (sector, PATHLOSS).

The association means of the computing module 10 determine the number N of necessary carriers C resulting from the dividing of this total traffic TF by the capacity of each carrier such as parameterized by the user. In one embodiment of the invention, if the number of necessary carriers exceeds the number of available radio frequencies, an alert message is displayed by the interactive device 3.

Figure 4:
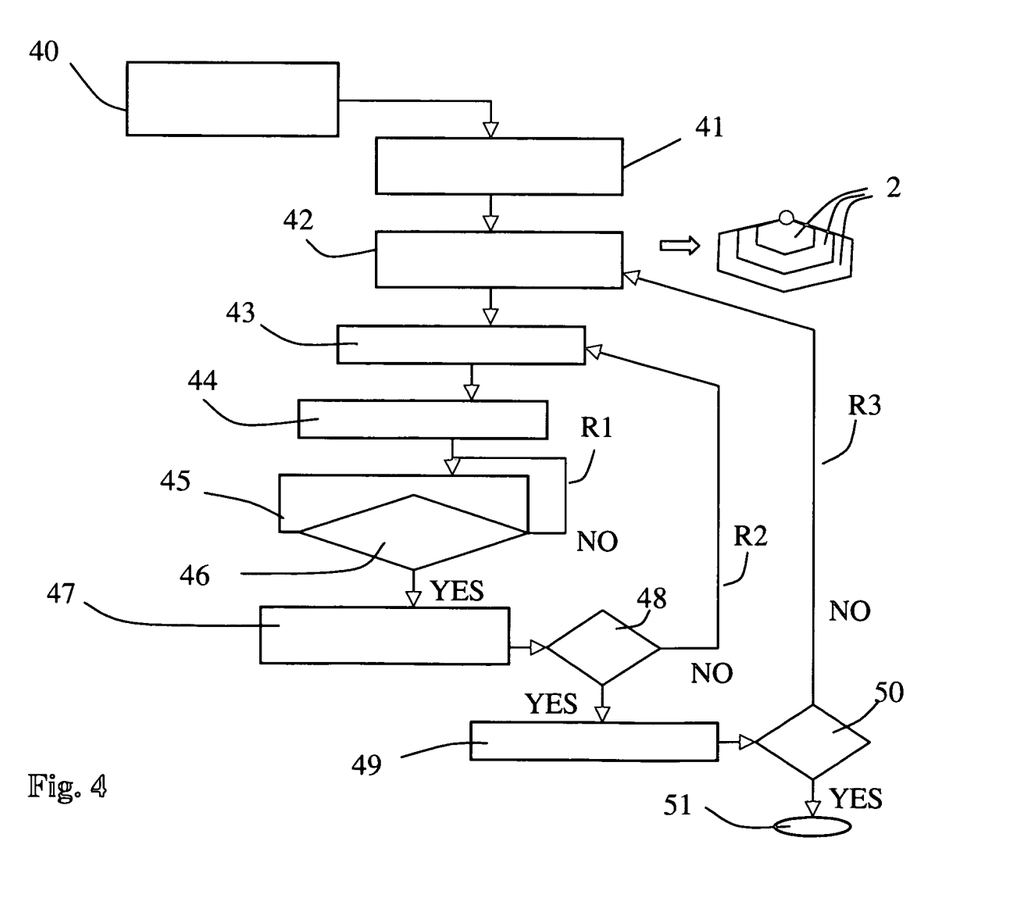
FIG. 4 is a flow chart of the steps of the method in one embodiment of the invention, FIG. 5 gives an example of a data processing system of the invention and a geographical map showing traffic distribution used in the power sharing method of the invention to allow equitable distribution of traffic between the carriers of each transmission sector.

With reference to FIG. 4, the computing module 10 performs an assignment step 42 assigning carriers to service areas 2 taking into account the number N of carriers C determined for each transmitter TR. The attenuation thresholds S1, S2 used to equally divide the total traffic TF to be handled into N equal shares (TF/N) are calculated by the association means of the computing module 10 to divide up the service areas 2. During this step 42, the computing module 10 therefore ensures the distribution of the total traffic TF to be handled into N complementary service areas 2 determined in relation to their radio attenuation and geographically forming rings increasingly distant from the transmitter TR such as illustrated FIGS. 1 and 2. So as not to penalize the service areas 2 the furthest from the transmitter, the method of the invention advantageously proposes assigning the highest powers to these distant areas.

However, power adjustment must be optimised for best use of the radio resources of the network N. In a preferred embodiment of the invention, the computing module 10 shares the power of the transmitter TR between the carriers C of one same sector Sc by using an optimisation programme adapted to obtain, according to a first criterion, a maximum value for the sum of the traffic handling capacities of the carriers C in all the sectors Sc and, according to a second criterion, minimum dispersion of the traffic handling capacities individually provided by the different carriers C of the sector Sc. Estimation parameters d5 stored in the memorising means 11 may be used by the computing module 10 to allow optimal sharing of the power of transmitter TR between the carriers C.

With reference to FIGS. 1 and 4, power adjustment is only made after a frequency planning step 44 including the assignment of a determined frequency f1, f2, f3 to each service area 21, 22, 23 so that the different carriers C used in a sector Sc are respectively associated with a single service area of said sector Sc. Once the geometry of the coverage area has been determined by dividing up into service areas 2, a frequency planning phase 43, 44 must be initiated, e.g. in similar or identical manner with respect to GSM according to the teaching of EP 1 283 647 (or its equivalent US 2003/07805). A calculation step 43 to calculate interference constraints between carriers C is performed using a matrix of compatibility between all the carriers C of all the cells. The system can be parametered to label the different carriers C of a sector Sc as exclusive of each other for the assignment of a radio frequency. Since the invention applies to data exchange technologies such as 3GPP, HSDPA and CDMA 2000x1xEvDO, which tolerate a reuse factor of 1 for frequencies, the influence of interference by adjacent frequencies can be ignored which makes it possible to accelerate frequency planning phase 43, 44. The actual frequency planning step 44 is then sequentially launched. It is to be noted here that this step is easier than with GSM since the number of frequencies is much lower in systems of CDMA type (wider channel width, the channels having a width of 1.25 or 5 MHz for example).

The result of the frequency planning step 44 is then used to calculate maps of signal-to-noise ratios SNR at every point and for every carrier C as follows:

$$SNR(\text{carrier}, x, y) = \rho_{ass}(\text{carrier}, x, y) * \frac{\text{received\_power}(\text{carrier}, x, y)}{\text{Noise} + \Sigma_{interferer}\text{received\_power}(\text{interferer})}$$

The traffic which can be handled by a carrier, or in other words the capacity of a carrier C, can then be estimated in relation to the powers allocated to each carrier of a transmitter TR. According to the invention, this capacity is determined using a discrete function Perf(SNR) set by the user in relation to the characteristics of the radio access technology:

Capacity(carrier)=$\int_{x,y}$ Perf(SNR(carrier,x,y)) By default, Shannon-Hartley's equation can be used:

Perf(SNR)=$W$*Log$_2$(1 +SNR)

where W corresponds to the bandwidth (Hz) and SNR is the signal to noise ratio (considering a white Gaussian noise), Perf(SNR) corresponding to a capacity or rate (by the transmitter) in bit/s.

In sector Sc the traffic handling capacity is the sum of the traffic which can be handled by each carrier C1, C2, CN-1, CN of the sector, this traffic capacity being calculated as follows:

Capacity(sector)=$\Sigma_i$ Capacity(Pi of the sector); i lying between 1 and N

The power adjustment step 45 can therefore be performed for each of the carriers C. This step 45, as mentioned above, comprises determining for each service area 2 the signal-to-noise ratios at each pixel then determining the traffic handling capacities of carriers C within a service area 2. This step therefore consists of sharing the power of the transmitter TR between the carriers of one same sector Sc. This sharing is carried out as determined by the computing module 10 so that a maximum value of the sum of the traffic handling capacities of the carriers C in all sectors Sc can be obtained. In addition to this first criterion, equal sharing of the traffic must also be made between the service areas 2. For this purpose a second traffic balancing criterion between each carrier C of one same sector Sc is taken into account.

Sharing is possible by adjusting the transmitters TR of the base stations BTS. Wide band power amplification makes it possible to transmit a different power signal on several carriers C by sharing the power of the amplifier. The adjustment means 13 of the data processing system 1 are designed to allow the adjustment of this power sharing. With unequal distribution of power between each transmission channel it is possible to optimise radio coverage, this coverage being limited by the carrier CN having the greatest power. As shown FIG. 2, unequal power distribution between several service areas 2 of a sector Sc allows transmission of data to the most distant service area (hence having the greatest radio attenuation) at a very good data rate by assigning most of the total power to the carrier CN associated with this area forming the last geographical ring. In a sector Sc with three service areas as illustrated FIG. 2, if the amplifier has a power of 40 W for example for radio transmission, a power P2 of 30 W may be assigned to carrier C2 (frequency f2) serving the area forming the last ring, a power P3 of 8 W may be assigned to carrier C3 (frequency 3) serving the area forming the second ring, and a power P1 of 2 W only may be assigned to carrier C1 (frequency 1) serving the service area the closest to the transmitter TR and corresponding to the first ring.

The adjustment means 13 of system 1 share out power taking into particular account the following information whose parameters have been set by the user:

the power of the amplifier serving the carrier C;
the list of the other carriers C amplified by the same amplifier.

With reference to FIG. 4, adjustment step 45 to adjust powers P1, P2, P3, P1', P2', P3') of each of the carriers C may finally comprise, for each sector Sc, a first estimation step 46 to estimate convergence between the first criterion corresponding to the obtaining of a maximum value for the sum of the traffic handling capacities of the carriers C of all sectors Sc, and the second criterion corresponding to minimum dispersion of the traffic handling capacities individually provided by the different carriers C of the sector Sc. This convergence estimation step 46 comprises for example the calculation of a convergence function TEMP whose parameters are set BY the user. This convergence function TEMP may correspond to a difference between a first value representing the first criterion and a value representing the second criterion. The trend in this difference is calculated for example by determining the variation of this difference between a parametered number Xi of successive calculations of said TEMP function that are made to take power distribution changes into account, then this trend is compared with an acceptance threshold Xa that is not to be exceeded for convergence to remain acceptable. As a non-limitative example, for Xi=1 the calculated trend corresponds to the variation between two successive calculations. Reiteration R1 of the sharing of transmitter power between the carriers C of one same sector Sc is then initiated if the acceptance threshold Xa is overstepped by said variation during the first convergence estimation step 46 between said first and second criteria.

In one embodiment of the invention, the convergence function TEMP is defined as follows:

TEMP=Cr1*$\Sigma_s$capacity(Sc)−Cr2*$\Sigma_s\Sigma$Pi|capacity(Pi)-capacity (Sc)/$N_{sector}$| in which:
Cr1 and Cr2 are respective weights of the first and second criteria;

Σ$_s$capacity(Sc) is the sum of the capacities of each sector Sc
capacity(Sc)/N$_{sector}$ is the mean capacity of the carriers in a sector Sc of N carriers.

This convergence function TEMP is calculated for example for each elementary variation in the power of a carrier C, the limits of each amplifier nonetheless being observed. With reference to FIG. 4, the first convergence estimation step 46 of the two criteria is performed to optimise power sharing, optimisation using a method based on simulated "annealing" techniques. Two parameters such as an acceptance threshold Xa and a number of iterations Xi may be set by the user so that said optimisation is made until the variation in the convergence function TEMP over Xi iterations is lower than threshold Xa. The solution corresponding to the highest value for the convergence function TEMP is kept. Since the value of this TEMP function corresponds to a difference between a first element representing the global capacity and a second element representing the disparity in the capacities of the carriers C within each sector Sc, it will be understood that this value will be higher the greater the global capacity (first criterion with Cr1 weighting) and that the traffic in the sectors Sc is distributed between the service areas 2 equally (second criterion with Cr2 weighting).

When the generated result for power sharing causes changes making frequency planning phase 43, 44 sub-optimal, on account of power changes at the transmitters TR, frequency planning has to be re-performed with these new powers. As illustrated FIG. 4, power adjustment step 45 is therefore followed by a calculation step 47 to calculate new frequency constraints arising from power adjustments. A second convergence estimation step 48 between said first and second criteria is then performed, here again with the use of an acceptance threshold Xa' and a number of iterations Xi' parameterized by the user. Along the same principle as in the first estimation step 46, the computing module 10 chooses from among the different solutions (memorised in the system) the solution with which it is possible to obtain the highest value for the convergence function TEMP.

For as long as the number of iterations Xi is not reached, the first estimation step 46 does not select a solution and automatically re-loops onto power adjustment step 45. When this number Xi is reached and exceeded, a comparison in variation is made between the acceptance threshold Xa and said trend in the convergence function TEMP. For as long as the variation in the TEMP function over Xi cycles exceeds threshold Xa, it is considered that there is no convergence, which triggers reiteration R1 of power sharing.

Similarly, the second convergence estimation step 48 between said first and second criteria is followed by reiteration R2 of preceding steps 43, 44 to calculate interference constraints between carriers C and to plan frequencies for as long as the variation in the TEMP function over Xi' cycles exceeds the acceptance threshold Xa'. In practice, having regard to the low number of frequencies, Xi'=2 can be chosen and a satisfactory result is obtained after a few iterations on step 43 for calculating constraints. Therefore the second estimation step 48 can be declared positive when the variation in the TEMP function over Xi'=2 iterations is lower than the acceptance threshold Xa'. Evidently, Xi'=1 may also be taken or values higher than 2.

With reference to FIG. 4, the solution allowing the obtaining of the highest value for the convergence function TEMP obtained after the second estimation step 48 is used in a new calculation step 49 to calculate the service areas 2 of each carrier C. This new calculation step 49 takes into particular account the changes arising from the previous power adjustment. A third estimation step 50 follows to estimate convergence between said first and second criteria along the same principle as for the two preceding estimation steps 46, 48. The acceptance threshold Xa" and the number of iterations Xi" are parameterized by the user to ensure convergence as and when the convergence function TEMP evolves.

For as long as the variation in the TEMP function over Xi" cycles exceeds the acceptance threshold Xa", the third convergence estimation step 50 between said first and second criteria is followed by a reiteration R3 of estimation step 42 estimating the service areas 2 to which the carriers C must be assigned. In practice, having regard to the low number of frequencies (with respect to GSM) a small number of iterations are sufficient to converge towards a satisfactory result. When the third estimation step 48 is declared positive, the parameters corresponding to the optimised solution are kept and memorised during a finalising step 50 of the process.

During this finalising step 50, the data processing system 1 therefore retains the following optimisation parameters:
the number of carriers C;
the frequency to be used for each of the carriers C;
the power for each of the carriers C; and
for each carrier C, the thresholds of received power for carrier selection among the different carriers of the sector Sc.

One of the advantages of the invention is to provide an optimised solution to the problems of covering areas with slow transmission rates in third generation data transmission systems which do not require connection to two cells of same frequency ("soft handover" constraint). The invention offers the possibility of maximising the capacity of the network N by adjusting the power of each carrier C for efficient handling of total traffic and to provide an optimised transmission rate in all parts of the coverage area. In addition this type of solution allows adaptation to developments in network capacity needs by distributing power unequally between the carriers C. This distribution is economic since it mostly avoids recourse to an additional amplifier for data transmission.

It will be obvious for those skilled in the art that the present invention permits embodiments in numerous other specific forms without departing from the scope of application of the invention such as claimed. Therefore the described embodiments are to be considered as illustrations which can be modified within the sphere defined by the scope of the appended claims and the invention is not to be construed as being limited to the details given above.

The invention claimed is:
1. Power planning method in a cellular wireless communication network (N) whose characteristic is to allow the reuse of one same frequency on all the cells of the network provided with radio base stations (BTS) having transmitters TR to transmit data to determined transmission sectors (Sc) and ensure radio coverage of areas defining respective cells, the method being implemented via a data processing system (1) provided with memorising means (11) storing data (d1) representing geographical areas divided into a plurality of dots or pixels (301, 302, 303) depending upon the division of said network, data (d2) characteristic of the sectors (Sc) and transmitters (TR) of the network, data (d3) representing the transmit/receive radio attenuation for each sector (Sc), data (d4) representing the traffic volume and distribution in the network, the method being characterized in that a computing module (10) of the data processing system (1), for each transmission sector (Sc) associated with a transmitter (TR) having a plurality of carriers (C1, C2, CN-1, CN), performs an assignment step (42) to assign carriers to service areas (2), the computing module (10) using the data (d1, d2, d3, d4) stored in the memorising means (11) to distribute the total traffic (TF) to be handled in the sector (Sc) into N shares of traffic

(TF/N) in N complementary services areas (2) determined in relation to their radio attenuation and geographically forming rings that are increasingly distant from the transmitter (TR), the method also comprising:

an initialising step (40) to set the following configuration parameters:

a list (d21) of the sectors (Sc) and their available power characteristics;

matrixes of propagation attenuation (d30) for each sector;

a matrix of traffic distribution (d41);

a coefficient of use representing a traffic volume (d42);

specifications (d22) of the number of carriers per sector;

matching rules (d23) to associate carriers with transmitter amplifiers;

estimation parameters (d5) planned to be used in at least one convergence function (TEMP) used to verify that said power adjustment corresponds in particular to the obtaining of a maximum value for the sum of the traffic handling capacities of the carriers (C) of all the sectors (Sc);

a frequency planning step (44) including the assignment of a determined frequency (f1, f2, f3) to each service area (21, 22, 23) so that the different carriers (C) used in a sector (Sc) are respectively associated with a single service area of said sector (Sc);

a power adjustment step (45) for each of the carriers, including the determination by the computing module (10), for each service area (2), of the signal-to-noise ratios in each pixel and of the traffic handling capacity of the carrier (C) associated with this service area (2), the sharing of transmitter power between the carriers of one same sector (Sc) being made as determined by the computing module (10) so that said power adjustment step (45) corresponds to obtaining a maximum value for the sum of the traffic handling capacities of the carriers (C) for each sector (Sc), said maximum resulting in particular from at least one comparison by the computing module (10) between several separate solutions for sharing power between the carriers (C).

2. Method as in claim 1, wherein the sharing of the power of a transmitter (TR) between the carriers (C) of one same sector (Sc) is made in the manner determined by the computing module (10) so that said power adjustment step (45) corresponds to obtaining minimum dispersion of the traffic handling capacities provided individually by the different carriers (C) of the sector (Sc).

3. Method as in claim 1, wherein the service areas (2) are determined in a sector (Sc) in relation to attenuation thresholds (S1, S2), a first service area (21) grouping together the pixels whose attenuation of transmit/receive radio signal propagation is lower than a first determined threshold (S1), whilst at least a second service area (22, 23) groups together pixels whose attenuation of transmit/receive radio signal propagation lies between said first threshold (S1) and a predetermined maximum attenuation (Max).

4. Data processing system (1) for implementing the method of claim 1, comprising a computing module (10) and memorising means (11) to store data (d1) representing geographical areas divided into a plurality of dots or pixels (301, 302, 303) depending upon the division of said network, data (d2) characteristic of the network sectors (Sc) and transmitters (TR), data (d3) representing transmit/receive radio attenuation for each sector (Sc), data (d4) representing the traffic volume and distribution in the network, characterized in that said data processing system comprises selection means (12) to select each transmission sector (Sc) associated with a transmitter (TR), the computing module (10) comprising association means to:

associate carriers (C1, C2, CN-1, CN) of the transmitter (TR) with service areas (2) using the data (d1, d2, d3, d4) stored in the memorising means (11) to divide the total traffic (TF) to be handled in the sector (Sc) into N shares of traffic (TF/N) in N complementary service areas (2) determined in relation to their radio attenuation;

associate a determined frequency (f1, f2, f3) with each service area (21, 22, 23) 50 that the different carriers (C) used in one sector (Sc) are respectively associated with a single service area of said sector (Sc);

said data processing system comprising means (13) to adjust the transmission power of each of the carriers (C) in relation to the sharing of transmitter power, as determined by the computing module (10), between the carriers of one same sector (Sc).

5. Method as in claim 1, wherein the data (d4) representing traffic volume and distribution in the network comprises traffic distribution maps made via the data processing system (1) through the use of data representing geographical areas and data representing traffic in the network of subscribers to said network including quantitative and qualitative measurements of subscriber traffic on the network, said measurements corresponding to at least one determined time slot, at least one network traffic distribution map (30) being obtained after selecting at least one geographical area via interactive means (3) between the user and said data processing system (1) and after retrieval by said system (1) of data representing traffic relating to said selected geographical area and to a determined time slot, which data is processed by the data processing system (1) to produce data representing covered cells associated with each transmitter.

6. Method as in claim 5, wherein the data representing traffic in the wireless communication network (N) comprises data provided by counter means (4) and extracted from at least one operating and maintenance centre (OMC) by extraction and tabling means (15) of said data processing system (1).

7. Method as in claim 5, wherein the assignment step (42) assigning carriers to service areas (2) is preceded by a calculation step (41) to calculate traffic distribution in an area corresponding to coverage of the network (N), step (41) to calculate traffic distribution using the traffic distribution maps to estimate traffic in each of the pixels and, with the data (d3) representing transmit/receive radio attenuation for each sector (Sc), takes into account the attenuation between transmitter and receiver in the sector under consideration and an assignment probability to the sector in relation to the received field and reception level of neighbouring sectors.

8. Method as in claim 7, wherein calculation step (41) of traffic distribution comprises the calculation of an accumulative distribution function of the traffic to be handled in relation to the level of propagation attenuation in each sector (Sc) under consideration.

9. Method as in claim 1, wherein the assignment step (42) assigning carriers to service areas (2) comprises, for at least one of the sectors (Sc), the calculation of total traffic (TF) to be handled and the determination of a number N of sufficient carriers (C) so that the capacity of all the carriers of the sector is able to handle the total traffic (TF).

10. Method as in claim 1, wherein the freguency planning step (44) is preceded by a calculation step (43) to calculate interference constraints between carriers (C) including the calculation of a compatibility matrix between all the carriers (C) of all the cells.

11. Method as in claim 2, wherein the power adjustment step (45) for each of the carriers (C) comprises for all the sectors (Sc) a first convergence estimation step (46) between a first criterion corresponding to the obtaining of a maximum value for the sum of the traffic handling capacities of the carriers (C) of the sectors (Sc), and a second criterion corresponding to the obtaining of minimum dispersion of the traffic handling capacities individually provided by the different carriers (C) of each sector (Sc).

12. Method as in claim 11, wherein said power adjustment step (45) is followed by a calculation step (47) to calculate new freguency constraints arising from power adjustment, a second estimation step (48) then being performed to estimate convergence between said first and second criteria.

13. Method as in claim 12, comprising a third estimation step (50) to estimate convergence between said first and second criteria, performed just after a new calculation step (49) of the service areas (2) of each carrier (C), said new calculation step (49) taking into particular account the changes arising from power adjustments.

14. Method as in claim 11, wherein each convergence estimation step (46, 48, 50) comprises at least one calculation of said convergence function (TEMP) of the type corresponding to a difference between a first value representing the first criterion and a value representing the second criterion, followed by a comparison of the variation in this difference with an acceptance threshold which is not to be exceeded so that convergence remains acceptable.

15. Method as in claim 14, wherein a reiteration (R1) of the sharing of transmitter power between the carriers of one same sector (Sc) is triggered if the acceptance threshold is exceeded during the first estimation step (46) of convergence between said first and second criteria.

16. Method as in claim 14 wherein a reiteration (R2) of steps (43, 44), to calculate interference constraints between carriers (C) and to plan frequencies, is triggered if the acceptance threshold is exceeded during the second estimation step (48) of convergence between said first and second criteria.

17. Method as in claim 14, wherein a reiteration (R3) of assignment step (42) assigning carriers to service areas (2) is triggered if the acceptance threshold is exceeded during the third estimation step (50) of convergence between said first and second criteria.

18. System as in claim 4, wherein the computing module (10) determines sharing of the power of transmitter (TR) between the carriers (C) of one same sector (Sc) using an optimisation programme adapted so that according to a first criterion said optimisation programme obtains a maximum value for the sum of the traffic handling capacities of the carriers (C) of all the sectors (Sc), and according to a second criterion said optimisation programme obtains minimum dispersion of the traffic handling capacities individually provided by the different carriers (C) of the sector (Sc), estimation parameters (d5) stored in the memorising means (11) being used by the computing module (10) to allow optimised sharing of the power of transmitter (TR) between the carriers (C).

19. System as in claim 4, wherein the association means are arranged to take into account attenuation thresholds (S1, S2) to determine the service areas (2) of a sector (Sc), the association means grouping together the pixels whose attenuation of transmit/receive radio signal propagation is lower than a first determined threshold (S1) in a first service area (21), and in at least a second service area (22, 23) the pixels whose attenuation of transmit/receive radio signal propagation lies between said first threshold (S1) and a predetermined maximum attenuation (Max).

20. System as in claim 4 comprising in a second memory (14) data that represents traffic data in the network for at least one determined time slot, the system also comprising:
- interactive means (3) between the user and said system (1) connected to the selection means (12) to select and display at least one of said geographical areas,
- superimposition means to superimpose, over said selected geographical area, data that is representative of traffic at a determined time slot to form at least one traffic distribution map (30) displayed by said interactive means (3),
- extraction and tabling means (15) using data provided by counting means (4) and derived from at least one operating and maintenance centre (OMC), to extract and table series of measurements in relation to geographical areas and time slots.

* * * * *

UNITED STATES PATENT AND TRADEMARK OFFICE
CERTIFICATE OF CORRECTION

PATENT NO. : 7,725,108 B2  Page 1 of 1
APPLICATION NO. : 11/417086
DATED : May 25, 2010
INVENTOR(S) : François Vincent It is certified that error appears in the above-identified patent and that said Letters Patent is hereby corrected as shown below:

Column 16, line 11, in Claim 4, delete "50" and insert --so--, therefore.

Column 16, line 63, in Claim 10, delete "freguency" and insert --frequency--, therefore.

Column 17, line 12, in Claim 12, delete "freguency" and insert --frequency--, therefore.

Signed and Sealed this

Seventeenth Day of August, 2010

David J. Kappos
*Director of the United States Patent and Trademark Office*